(12) United States Patent
Kanz et al.

(10) Patent No.: US 7,441,573 B2
(45) Date of Patent: Oct. 28, 2008

(54) PNEUMATIC TIRE HAVING A RUBBER COMPONENT CONTAINING SHORT UNTWISTED CORD

(75) Inventors: Carlo Kanz, Mamer (LU); René François Reuter, Burden (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 439 days.

(21) Appl. No.: 11/268,046

(22) Filed: Nov. 7, 2005

(65) Prior Publication Data

US 2006/0128837 A1 Jun. 15, 2006

Related U.S. Application Data

(60) Provisional application No. 60/634,803, filed on Dec. 9, 2004.

(51) Int. Cl.
*B60C 1/00* (2006.01)
*B60C 9/00* (2006.01)
(52) U.S. Cl. ............ 152/209.4; 152/451; 152/458; 523/222; 57/206; 57/902; 428/222
(58) Field of Classification Search ............ 152/458, 152/209.4, 451; 523/222; 57/206–209, 1 UN, 57/902; 428/85, 90–92, 96, 97, 222, 295.1, 428/295.4, 295.7, 296.1, 296.4, 359, 361, 428/362, 369, 371, 399
See application file for complete search history.

(56) References Cited

U.S. PATENT DOCUMENTS

| | | | | |
|---|---|---|---|---|
| 3,050,098 A | * | 8/1962 | Grote | 152/458 |
| 3,133,583 A | * | 5/1964 | Dobson | 152/458 |
| 3,315,722 A | * | 4/1967 | Marzocchi et al. | 152/458 |
| 3,538,974 A | * | 11/1970 | Marzocchi | 152/458 X |
| 3,570,574 A | | 3/1971 | Marker et al. | |
| 3,620,280 A | * | 11/1971 | Marzocchi | 152/209.4 |
| 3,682,217 A | * | 8/1972 | Marzocchi | 152/458 |
| 3,682,221 A | * | 8/1972 | Marzocchi et al. | 152/458 X |
| 3,874,982 A | | 4/1975 | Marzocchi et al. | |
| 3,973,613 A | | 8/1976 | Marzocchi et al. | |
| 4,722,381 A | | 2/1988 | Hopkins et al. | |
| 4,791,973 A | | 12/1988 | Davisson | |
| 4,871,004 A | | 10/1989 | Brown et al. | |
| 5,052,458 A | | 10/1991 | Bajer | |
| 5,087,668 A | | 2/1992 | Standstrom et al. | |
| 5,109,661 A | * | 5/1992 | Okamoto et al. | 152/451 X |
| 5,783,003 A | | 7/1998 | Lescoffit | |
| 5,935,354 A | | 8/1999 | Billieres | |
| 6,209,298 B1 | * | 4/2001 | Tamoto | |

(Continued)

FOREIGN PATENT DOCUMENTS

| | | | |
|---|---|---|---|
| JP | 52075702 A | * | 6/1977 |
| WO | 058861 | | 7/2004 |

OTHER PUBLICATIONS

European Search Report Jan. 24, 2006.

*Primary Examiner*—Adrienne C Johnstone
(74) *Attorney, Agent, or Firm*—John D. DeLong

(57) ABSTRACT

The present invention relates to a pneumatic tire having a component including at least one diene based rubber and discontinuous textile cord having at least two textile yarns, wherein the cord is partially untwisted.

12 Claims, 1 Drawing Sheet

U.S. PATENT DOCUMENTS 6,255,379 B1 7/2001 Hahn et al.
6,306,949 B1 * 10/2001 Materne et al. ....... 152/209.4 X
6,588,470 B2 7/2003 Kanenari et al.
6,668,889 B1 12/2003 Losey et al.

* cited by examiner

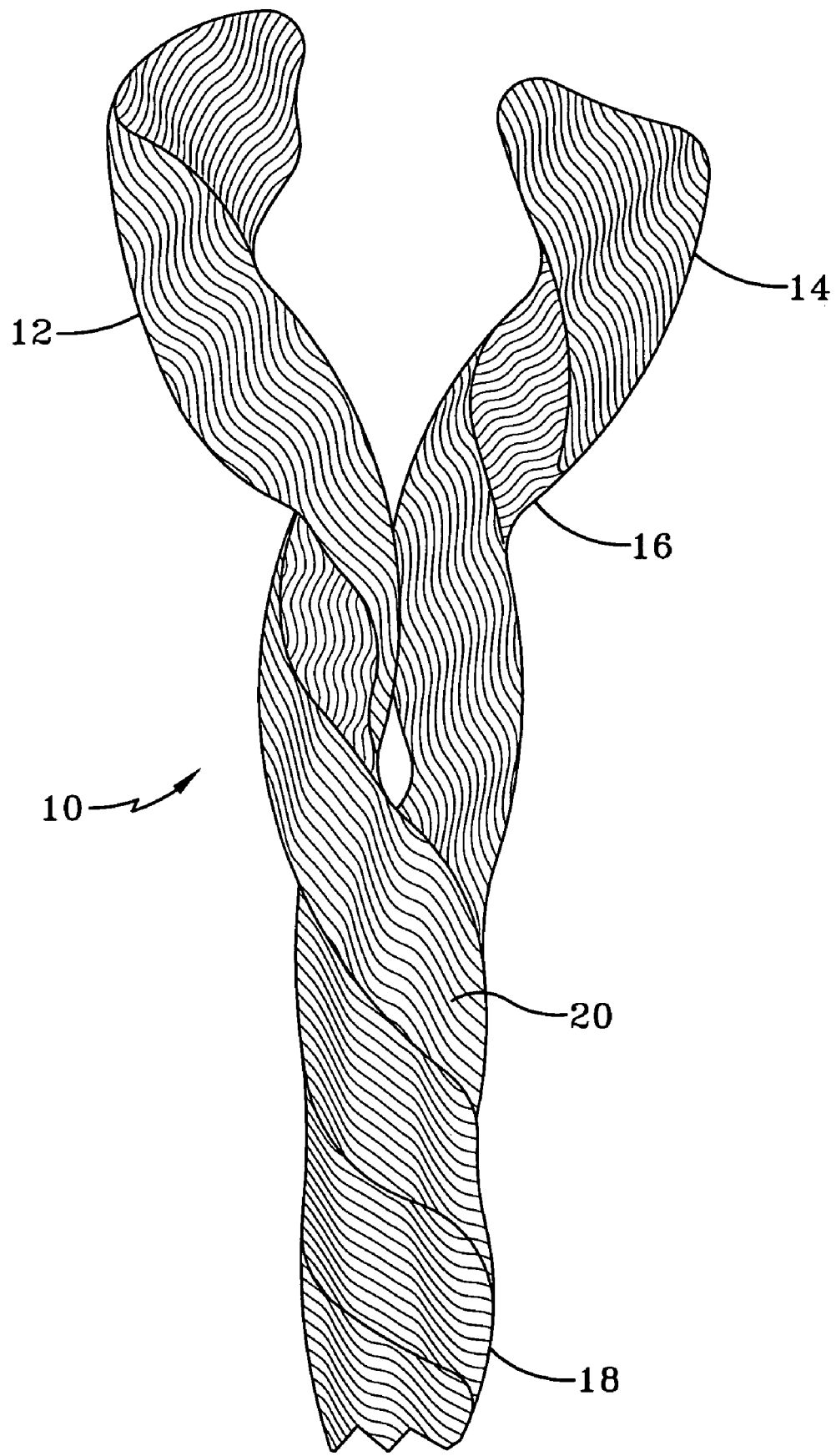

PNEUMATIC TIRE HAVING A RUBBER COMPONENT CONTAINING SHORT UNTWISTED CORD

This application claims priority from co-pending U.S. Provisional Application No. 60/634,803, filed Dec. 9, 2004.

BACKGROUND OF THE INVENTION

Typical tire manufacturing processes generate scrap materials, including short lengths of textile cord. Instead of simply disposing of these scraps, there exists a need to incorporate the scrap cord into tires in a beneficial manner.

SUMMARY OF THE INVENTION

The present invention relates to a pneumatic tire having a component comprising at least one diene based rubber and discontinuous textile cord comprising at least two textile yarns, wherein the cord is partially untwisted.

BRIEF DESCRIPTION OF THE DRAWING

The sole FIGURE illustrates a partially untwisted cord usable in an embodiment of the invention.

DETAILED DESCRIPTION OF THE INVENTION

There is disclosed a pneumatic tire having a component comprising at least one diene based rubber and discontinuous textile cord comprising at least two textile yarns, wherein the cord is partially untwisted.

The discontinuous textile cord present in the tire component may be made from any fiber cord suitable for use in a tire as is known in the art. In one embodiment, the discontinuous textile cord is made from continuous cords of various compositions that are typically used for carcass ply or belts such as, for example, but not intended to be limited to, glass fibers, carbon fibers, rayon fibers, polyester fibers, cellulose fibers, polyacrylonitrile fibers, polyamide fibers, polyaramide fibers, and steel fibers, and hybrid cords of more than one of these fibers. Such cords and their construction, whether monofilament or as twisted filaments, are well known to those having skill in such art. Continuous fiber yarns are typically produced as multifilament bundles by extrusion of the filaments from a polymer melt. Continuous textile cord is produced by drawing fiber into yarns comprising a plurality of the fibers, followed by twisting a plurality of these yarns into a cord. Such continuous yarns may be treated with a spin-finish to protect the filaments from fretting against each other and against machine equipment to ensure good mechanical properties. In some cases the continuous yarn may be top-coated with a so-called adhesion activator prior to twisting the yarn into cord. The continuous cord may also be treated with an RFL (Resorcinol-Formaldehyde-Latex) dip after twisting the yarn into cord. The adhesion activator, typically comprising a polyepoxide, serves to improve adhesion of the cord to rubber compounds after it is dipped with an RFL dip.

The discontinuous textile cord may be produced by cutting or chopping longer lengths of cord into relatively short lengths suitable for use in the present invention. The longer lengths of cord are cut or chopped into short lengths by cutting substantially across the cross section of the cord, substantially across the lengthwise axis of the cord. In one embodiment, the discontinuous textile cord comprises short chopped cord having a length in the range of from about 0.1 to about 1 cm. In another embodiment, the discontinuous textile cord comprises short chopped cord having a length in the range of from about 0.3 to about 0.8 cm.

The discontinuous textile cord is partially untwisted. By partially untwisted, it is meant that in the cord comprising two or more twisted together yarns, the two or more yarns are separated from one another along at least part of the lengthwise axis of the cord. With reference to the FIGURE, the FIGURE shows a partially untwisted cord 10, where yarns 12 and 14 are untwisted from each other at end 16, and remain twisted at end 18. In one embodiment, the discontinuous textile cord may be untwisted at least partially along its length, such that the two or more yarns are separated from one another along from about one-quarter to about three-quarters of the length of the cord. In one embodiment, the discontinuous textile cord may be untwisted at least partially along its length, such that the two or more yarns are separated from one another along from about one third to about two thirds of the length of the cord.

At the end 18 of the cord 10 that remains twisted, the cord may be treated to prevent further untwisting of the cord. Such treatments may include coatings, heat treatments, adhesive treatments, mechanical treatments such as hammering, squeezing, and asymmetric squeezing, and the like. In one embodiment as shown in the FIGURE, end 18 may be coated with a protective coating 20 to prevent untwisting of end 18. Protective coating 20 may be any suitable coating material, including but not limited to waxes, resins, epoxies, rubbers, polymers, and the like. In another embodiment, end 18 may be heat treated to fuse the yarns together to prevent further untwisting. In another embodiment, end 18 may be treated with an adhesive to cause the yarns to adhere together to prevent further untwisting.

In one embodiment, the tire component comprises from 1 to 20 parts by weight, per 100 parts by weight of rubber (phr), of discontinuous textile cord. In another embodiment, the rubber composition comprises from 2 to 10 phr of discontinuous textile cord.

The discontinuous textile cord may be produced by a batch or continuous process involving cutting longer lengths of cord to the desired length, and at least partially untwisting the cord. Such processes may be fully automatic, or manual. In one embodiment, the uncut cord may be maintained under tension using spools, rollers, grips, suction, or the like, with rotation imposed at one end of the cord to induce the desired amount of untwisting in the cord. A suitable treatment may then be applied to a portion of the cord that remains twisted, to prevent further untwisting. Finally, the untwisted and treated cord may be cut to the desired length using a cold knife, hot knife, anvil, or the like, to produce the at least partially untwisted discontinuous textile cord.

In addition to the discontinuous textile cord, the rubber component contains a rubber containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate. Additional examples of rubbers which may be used include a carboxylated rubber, silicon-coupled and tin-coupled star-branched polymers. The preferred rubber or elastomers are polybutadiene, SBR, and synthetic and natural polyisoprene.

In one aspect, the rubber to be combined with the discontinuous textile cord may be a blend of at least two diene based rubbers. For example, a blend of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene butadiene rubbers, cis 1,4-polybutadiene rubbers and emulsion polymerization prepared butadiene/acrylonitrile copolymers.

In one aspect of this invention, an emulsion polymerization derived styrene butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

When used in the tire component, the relatively high styrene content of about 30 to about 45 for the E-SBR can be considered beneficial for a purpose of enhancing traction, or skid resistance. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire component composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The term "phr" as used herein, and according to conventional practice, refers to "parts by weight of a respective material per 100 parts by weight of rubber, or elastomer."

In addition to the discontinuous textile cord and a non-conjugated diene and second rubber in the rubberized component of the tire, conventional fillers may be also present. The amount of such conventional fillers may range from 10 to 250 phr. Preferably, the filler is present in an amount ranging from 20 to 100 phr.

The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc.

Commonly employed carbon blacks can be used as a conventional filler. Representative examples of such carbon blacks include N110, N115, N121, N134, N220, N231, N234, N242, N293, N299, S315, N326, N330, M332, N339, N343, N347, N351, N358, N375, N539, N550, N582, N630, N642, N650, N660, N683, N754, N762, N765, N774, N787, N907, N908, N990 and N991. These carbon blacks have iodine absorptions ranging from 9 to 170 g/kg and DBP No. ranging from 34 to 150 cm$^3$/100 g.

It may be preferred to have the rubber composition for use in the tire component to additionally contain a conventional sulfur containing organosilicon compound. Examples of suitable sulfur containing organosilicon compounds are of the formula:

$$Z\text{-Alk-}S_n\text{-Alk-}Z$$

in which Z is selected from the group consisting of

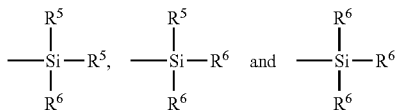 and 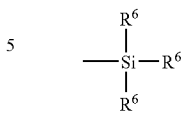

where $R^5$ is an alkyl group of 1 to 4 carbon atoms, cyclohexyl or phenyl; $R^6$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis (triethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis (trimethoxysilylpropyl) trisulfide, 3,3'-bis (triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis (tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis (trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

The preferred sulfur containing organosilicon compounds are the 3,3'-bis(trimethoxy or triethoxy silylpropyl) sulfides. The most preferred compounds are 3,3'-bis(triethoxysilylpropyl) disulfide and 3,3'-bis(triethoxysilylpropyl) tetrasulfide.

Therefore as to the above formula, preferably Z is where $R^6$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

The amount of the sulfur containing organosilicon compound of the above formula in a rubber composition will vary depending on the level of other additives that are used. Generally speaking, the amount of the compound of the above formula will range from 0.5 to 20 phr. Preferably, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur vulcanizing agent is elemental sulfur. The sulfur vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber and compound is mixed in one or more non-productive mix stages. The terms "non-productive" and "productive" mix stages are well known to those having skill in the rubber mixing art. If the rubber composition contains a sulfur-containing organosilicon compound, one may subject the rubber composition to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes. The rubber composition may be calendared for use as various components in a tire. The calendaring operation may induce at least partial alignment of the discontinuous textile cord such that the discontinuous textile cord is at least partially aligned along its length with the calendaring direction of the rubber component.

The rubber composition may be incorporated in a variety of rubber components of the tire. For example, the rubber component may be a tread (including tread cap and tread base), sidewall, apex, chafer, sidewall insert, wirecoat, innerliner, and ply coat. In one embodiment, the compound is a sidewall insert.

The pneumatic tire of the present invention may be a passenger tire, motorcycle tire, aircraft tire, agricultural, earthmover, off-the-road, truck tire and the like. The term "truck tire" includes light truck, medium truck and heavy truck. Preferably, the tire is a passenger or truck tire. The tire may also be a radial or bias, with a radial being preferred.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air.

EXAMPLE 1

An RFL dipped fabric cord (rayon cord 1840/2 denier) was manually cut into pieces of about 0.5 cm length. About one half of the length of the cord was manually dipped into melted wax, followed by cooling and solidification of the wax. After cooling of the wax, the wax-free end of the cord was untwisted manually to form a partially untwisted textile cord as depicted in FIG. 1.

Samples of the untwisted textile cord were compounded in a rubber composition. Control compounds containing cut but not untwisted cord (Sample 2) and no cord (Sample 1) were also made. Sample 1 containing no cord was a control; Sample 2 was a control with 3 phr of silica and 1 phr coupling agent is replaced by 3 phr of twisted cut cord; Sample 3 exemplifies the present invention with 3 phr of silica and 1 phr coupling agent is replaced by 3 phr of untwisted cut cord. All amounts in Table 1 are expressed in phr (parts by weight of a specified ingredient per 100 parts by weight of elastomer.)

The rubber compositions of Table 1 were molded and cured at about 160° C. for about 16 minutes. Viscoelastic properties of the cured compounds were then measured with results as shown in Table 2 as an average of two measure values for each data point. Viscoelastic properties were measured using a Metravib strain sweep viscoanalyzer using a test temperature of 30° C. and a frequency of 7.8 Hz. Physical properties of the cured compounds were measured following DIN 53504 at a test temperature of 23° C., with results as shown in Table 3.

TABLE 1

| | Sample | | |
| --- | --- | --- | --- |
| | Control 1 | Control 2 | Invention 3 |
| Non-Productive Mix Stage | | | |
| Natural rubber [1] | 80 | 80 | 80 |
| Polybutadiene (cis 1,4-) rubber [2] | 20 | 20 | 20 |
| Carbon black [3] | 30 | 30 | 30 |
| Silica [4] | 15 | 12 | 12 |
| Coupling agent [5] | 5 | 4 | 4 |
| Fatty Acid | 1 | 1 | 1 |
| Productive Mix Stage | | | |
| Zinc Oxide | 4 | 4 | 4 |
| Accelerators [6] | 2 | 2 | 2 |
| Antioxidant [7] | 3 | 3 | 3 |
| Sulfur | 2 | 2 | 2 |
| Twisted cord [8] | 0 | 3 | 0 |
| Untwisted cord [9] | 0 | 0 | 3 |

[1] Natural rubber (cis 1,4 polyisoprene)

[2] Cis 1,4 polybutadiene rubber as BUDENE 1207 by The Goodyear Tire & Rubber Company

[3] N550/FEF carbon black type

[4] Silica as Zeosil 1165 MP from the Rhone Poulenc Company

[5] Blend of bis(3-triethoxysilylpropyl)tetrasulfide and carbon black in a 1:1 ratio as X50S from Degussa GmbH

[6] Sulfenamide and thiuram type

[7] Dihydrotrimethyl quinoline type

[8] Twisted cut cords, 0.5 cm length

[9] Untwisted cut cords, 0.5 cm length

TABLE 2

| | Sample | | | |
|---|---|---|---|---|
| | 1 | 2 | 3a | 3b |
| Twisted Cord | 0 | 3 | 0 | 0 |
| Untwisted Cord | 0 | 0 | 3 | 3 |
| Cord Orientation | — | — | with shear direction | against shear direction |
| Strain, Elastic Modulus, Pa | | | | |
| 1% | 1275000 | 1470000 | 1345000 | 1410000 |
| 1.5% | 1225000 | 1405000 | 128000 | 1355000 |
| 3% | 1135000 | 1285000 | 1185000 | 1250000 |
| 6% | 1040000 | 1170000 | 1085000 | 1145000 |
| 12% | 951000 | 1050000 | 981500 | 1030000 |
| 20% | 868000 | 945000 | 889500 | 931000 |
| Strain Inelastic Modulus, Pa | | | | |
| 1% | 218000 | 255000 | 229500 | 239000 |
| 1.5% | 219000 | 254000 | 227000 | 239000 |
| 3% | 209500 | 241500 | 218000 | 229000 |
| 6% | 191500 | 216500 | 197000 | 209000 |
| 12% | 168500 | 189000 | 174000 | 183000 |
| 20% | 153000 | 170000 | 158000 | 164500 |
| Strain, Tan Delta | | | | |
| 1% | 0.171 | 0.1735 | 0.171 | 0.169 |
| 1.5% | 0.179 | 0.1805 | 0.1775 | 0.176 |
| 3% | 0.1845 | 0.188 | 0.184 | 0.1835 |
| 6% | 0.184 | 0.185 | 0.1815 | 0.1825 |
| 12% | 0.177 | 0.18 | 0.177 | 0.178 |
| 20% | 0.176 | 0.18 | 0.1775 | 0.1765 |

Sample 3a was cut out of the vulcanized compound sheet in a way so that the direction of the shear movement was in the same direction as the compound was processed in the mill. Sample 3b was cut out of the vulcanized compound sheet so that the direction of the shear movement was in a 90° angle to the direction of the compound processing in the mill.

The elastic modulus G' and inelastic modulus G" of sample 2 is higher than for samples 3a and 3b. A difference between the differently oriented sample 3a and sample 3b is observable.

TABLE 3

| | Sample | | |
|---|---|---|---|
| | 1 | 2 | 3 |
| Twisted cord | 0 | 3 | 0 |
| Untwisted cord | 0 | 0 | 3 |
| $S_0$, mm² | 5.81 | 4.76 | 4.56 |
| $L_0$, mm | 21.04 | 20.8 | 21.11 |
| Modulus 100%, MPa | 0.9 | 1.94 | 1.65 |
| Modulus 200%, MPa | 2.25 | 3.54 | 3.18 |
| Modulus 300%, MPa | 4.63 | 6.12 | 6.07 |
| Tensile strength, MPa | 9.83 | 7.03 | 12.73 |
| Elongation, % | 470.96 | 331.3 | 480.77 |
| True tensile, MPa | 56.12 | 30.31 | 73.93 |
| Ratio | 5.18 | 3.16 | 3.67 |
| Specific energy, N/mm² | 14.85 | 8.88 | 20.93 |

The tensile properties of the cured compound show the different reinforcing effect of the untwisted cord compared to the twisted cord. Although the 300% modulus of the samples 2 and 3 are both greater than sample 1 containing no cord, the ultimate tensile strength is only increased in the presence of the untwisted cord. The elongation for sample 3 is about the same as the control sample 1 but is about 150% less for control sample 2.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a component comprising:
   at least one diene based rubber; and
   discontinuous textile cord comprising at least two textile yarns, wherein said yarns are untwisted along about one-quarter to about three-quarters of the length of said discontinuous textile cord.

2. The pneumatic tire of claim 1, wherein from 1 to 20 parts by weight, per 100 parts by weight of rubber, of said discontinuous textile cord is present.

3. The pneumatic tire of claim 1 wherein said discontinuous textile cord in its twisted form has a length of from about 0.1 to 1 cm.

4. The pneumatic tire of claim 1 wherein said discontinuous textile cord is chopped textile cord.

5. The pneumatic tire of claim 1 wherein said discontinuous textile cord comprises a twisted end where said yarns are twisted and an untwisted end where said yarns are untwisted, wherein the twisted end comprises a protective coating.

6. The pneumatic tire of claim 1 wherein said yarn comprises at least one textile fiber material selected from the group consisting of glass fibers, carbon fibers, rayon fibers, polyester fibers, cellulose fibers, polyacrylonitrile fibers, polyamide fibers, polyaramide fibers, steel fibers, and mixtures thereof.

7. The pneumatic tire of claim 1 wherein the component further comprises comprises 10 to 250 phr of a filler selected from carbon black and silica.

8. The pneumatic tire of claim 7 wherein said filler comprises silica.

9. The pneumatic tire of claim 7 wherein said filler comprises carbon black.

10. The pneumatic tire of claim 1 wherein the component further comprises from 0.5 to 20 phr of a sulfur containing organosilicon compound of the formula:

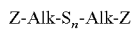

in which Z is selected from the group consisting of

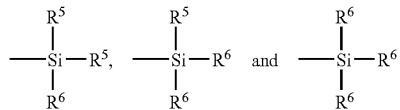

where $R^5$ is an alkyl group of 1 to 4 carbon atoms, cyclohexyl or phenyl; $R^6$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

11. The pneumatic tire of claim 1 wherein said tire is selected from the group consisting of passenger tires, motorcycle tires, aircraft tires, agricultural, earthmover, off-the-road and truck tires.

12. The pneumatic tire of claim 1 wherein said component is selected from the group consisting of a tread cap, tread base, sidewall, apex, chafer, sidewall insert, innerliner, wirecoat and ply coat.

* * * * *